US012508201B2

(12) United States Patent
Curley

(10) Patent No.: US 12,508,201 B2

(45) **Date of Patent: *Dec. 30, 2025**

(54) MULTI-AXIS MASSAGE GUN

(71) Applicant: Charles M Curley, Cortland, NY (US)

(72) Inventor: Charles M Curley, Cortland, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/231,499

(22) Filed: Jun. 8, 2025

(65) Prior Publication Data

US 2025/0295554 A1 Sep. 25, 2025

Related U.S. Application Data

(63) Continuation-in-part of application No. 17/488,831, filed on Sep. 29, 2021, now Pat. No. 12,350,222.

(51) Int. Cl.

*A61H 23/02* (2006.01)
*A61H 15/00* (2006.01)
*A61H 23/00* (2006.01)

(52) U.S. Cl.

CPC ..... *A61H 23/0254* (2013.01); *A61H 15/0092* (2013.01); *A61H 23/006* (2013.01); *A61H 2015/0021* (2013.01); *A61H 2201/0153* (2013.01); *A61H 2201/1215* (2013.01); *A61H 2201/5035* (2013.01)

(58) Field of Classification Search

CPC .... A61H 1/006; A61H 1/008; A61H 23/0254; A61H 2201/0153; A61H 2201/1215; A61H 2201/5035; A61H 15/00-0092

USPC .......................................................... 601/108

See application file for complete search history.

(56) References Cited

U.S. PATENT DOCUMENTS

| | | | |
|---|---|---|---|
| 1,657,765 | A | 1/1928 | Pasque |
| 2,691,978 | A | 10/1954 | Kirby |
| 4,729,368 | A | 3/1988 | Guitay |
| 5,085,207 | A | 2/1992 | Fiore |
| 5,215,078 | A | 6/1993 | Fulop |
| 5,665,053 | A | 9/1997 | Jacobs |
| 6,352,518 | B1 | 3/2002 | Wolf |
| 6,517,499 | B1 | 2/2003 | Pereira |
| 6,758,826 | B2 | 7/2004 | Luettgen |
| 7,147,611 | B2 | 12/2006 | Kassel |
| 7,169,120 | B2 | 1/2007 | Murdock |
| 7,634,314 | B2 | 12/2009 | Applebaum |
| 7,699,794 | B2 | 4/2010 | Meyer |
| 7,806,840 | B2 | 10/2010 | Chen |
| 7,988,650 | B2 | 8/2011 | Nan |
| 8,348,866 | B2 | 1/2013 | Tudico |
| 8,435,194 | B2 | 5/2013 | Dverin |
| 9,295,607 | B2 | 3/2016 | Rosenberg |

(Continued)

*Primary Examiner* — Paige Kathleen Bugg

(74) *Attorney, Agent, or Firm* — Chris Tanner; BlueCollarIP.com

(57) ABSTRACT

A handheld motorized massage gun is disclosed that combines the percussive action of conventional percussive-type massage guns with muscle stretching action of rolling element massage devices. The self-powered, self-standing device orbits a massage roller along a circular path about a virtual axis which induces both percussive forces and stretching forces along the axis of the target muscle fibers. The roller suspension of the device facilitates two operating modes that allow the device to be operated in a stationary position or with traversing motion for the purpose of treating cellulite and/or providing muscle rehabilitation.

15 Claims, 14 Drawing Sheets

(56) References Cited

U.S. PATENT DOCUMENTS

| | | | |
|---|---|---|---|
| 9,572,744 B2 | 2/2017 | Giraud | |
| 9,675,381 B2 | 6/2017 | Hollinger | |
| 10,004,658 B2 | 6/2018 | Marty | |
| 10,034,813 B1 | 7/2018 | Silver | |
| 10,105,280 B2 | 10/2018 | Santos | |
| 10,143,617 B2 | 12/2018 | Nelson | |
| 10,182,962 B2 | 1/2019 | Godfrey | |
| 10,327,980 B1 | 6/2019 | Termanini | |
| 10,357,425 B2 | 7/2019 | Wersland | |
| 10,470,970 B2 | 11/2019 | Nazarian | |
| 10,492,980 B2 | 12/2019 | Giraud | |
| 10,561,574 B1 * | 2/2020 | Marton | A61H 23/006 |
| 10,617,588 B2 | 4/2020 | Wersland | |
| 10,682,281 B2 | 6/2020 | Smith | |
| 10,702,448 B2 | 7/2020 | Wersland | |
| 10,722,424 B2 | 7/2020 | Giraud | |
| 10,729,614 B2 | 8/2020 | Marton | |
| 10,842,703 B2 | 11/2020 | Zhang | |
| 10,881,577 B2 | 1/2021 | Hashimoto | |
| 10,945,915 B2 | 3/2021 | Wersland | |
| 10,959,908 B2 | 3/2021 | Lee | |
| 11,083,666 B2 | 8/2021 | Jeong | |
| 11,090,222 B2 | 8/2021 | Zhou | |
| 11,109,918 B2 | 9/2021 | Silver | |
| 11,160,721 B2 | 11/2021 | Wersland | |
| 11,253,423 B1 | 2/2022 | Williams | |
| 11,357,697 B2 | 6/2022 | Wersland | |
| 11,376,187 B2 | 7/2022 | Zhao | |
| 11,432,994 B2 | 9/2022 | Wersland | |
| 11,452,670 B2 | 9/2022 | Wersland | |
| 11,478,397 B1 | 10/2022 | Gonglach | |
| 11,478,400 B1 | 10/2022 | Marton | |
| 11,497,676 B2 | 11/2022 | Liu | |
| 11,529,284 B2 | 12/2022 | Williams | |
| 11,559,462 B2 | 1/2023 | Wersland | |
| 11,564,860 B2 | 1/2023 | Wersland | |
| 11,654,076 B2 | 5/2023 | Cross | |
| 11,684,539 B2 | 6/2023 | Ferber | |
| 11,717,465 B2 | 8/2023 | Nelson | |
| 11,723,830 B1 | 8/2023 | Marton | |
| 11,730,668 B2 | 8/2023 | Wersland | |
| 11,752,064 B2 | 9/2023 | Coleman | |
| 11,793,713 B2 | 10/2023 | Vierheller | |
| 11,813,221 B2 | 11/2023 | Wersland | |
| 11,890,253 B2 | 2/2024 | Wersland | |
| 11,957,635 B2 | 4/2024 | Wersland | |
| 11,974,956 B2 | 5/2024 | Lawrie | |
| 12,048,666 B2 | 7/2024 | Marton | |
| 12,171,707 B1 | 12/2024 | Curley | |
| 12,350,222 B2 * | 7/2025 | Curley | A61H 23/006 |
| 2002/0107459 A1 | 8/2002 | Chang | |
| 2003/0009116 A1 * | 1/2003 | Luettgen | A61H 19/34<br>601/72 |
| 2003/0028134 A1 | 2/2003 | Lev | |
| 2007/0232966 A1 | 10/2007 | Applebaum | |
| 2007/0287938 A1 | 12/2007 | Shields | |
| 2013/0261516 A1 | 10/2013 | Cilea | |
| 2019/0262221 A1 | 8/2019 | Bailar | |
| 2019/0262222 A1 | 8/2019 | Schwarz | |
| 2020/0261306 A1 | 8/2020 | Pepe | |
| 2020/0268594 A1 | 8/2020 | Pepe | |
| 2020/0390644 A1 | 12/2020 | Yang | |
| 2021/0322257 A1 | 10/2021 | Lee | |
| 2022/0087894 A1 * | 3/2022 | Chen | A61H 15/0085 |
| 2022/0117841 A1 | 4/2022 | Tellam | |
| 2022/0160578 A1 | 5/2022 | Curley | |
| 2022/0331199 A1 | 10/2022 | Zang | |
| 2023/0233401 A1 | 7/2023 | Wu | |
| 2023/0398034 A1 | 12/2023 | Coleman | |
| 2024/0033173 A1 | 2/2024 | Busick | |
| 2024/0269034 A1 | 8/2024 | Lawrie | |

* cited by examiner

MULTI-AXIS MASSAGE GUN

FIELD OF THE INVENTION

This invention relates to the field of massage devices that utilize percussive motion or rolling motion to simulate the manual therapeutic massage techniques that are historically utilized by massage therapists.

BACKGROUND OF THE INVENTION

There exist many massage therapies and massage devices which have been designed to rehabilitate muscle fiber or treat cellulite by rubbing, twisting, beating, stretching, compressing and rolling the upper superficial fatty layer and muscle layers that reside immediately underneath the skin. Two of the most common massage techniques used by massage therapists are called Myofascial Release and Tapotement. While these are techniques utilized manually by massage therapists, mechanized devices have been developed to simulate each of these techniques, thus alleviating the tiring manual tasks utilized by human massage therapists.

One simple type of massage therapy device simulates a technique called myofascial release, which is a form of soft tissue therapy intended to increase blood circulation, decompose fat cells, stretch muscles and relieve pain. Tightened muscle and tissue fibers are called "myofascial restrictions". Myofascial release therapy stretches and compresses the fascia to alleviate the restrictions, decompose fat cells and make the tissue fiber more flexible. FIG. 1 illustrates the reciprocating motion of the therapist's hands while performing this type of massage. The fascial region between the two hands is compressed as the hands move together, and then stretched as the hands move apart, such that the massage-receiving region is cyclically compressed and stretched to relieve the restrictions.

Massage devices that simulate the Myofascial Release technique typically utilize balls or rollers that are traversed over the fascia regions to release the restrictions. FIG. 2 is reproduced from prior art U.S. Pat. No. 7,169,120 and illustrates a very simple massage device that utilizes a revolving ball to simulate myofascial release massage. This is called a "passive" massage device because the reciprocating motion is provided by the user, who grasps the device 1090 by handle 1098 and drags the device along the massage-receiving surface with a reciprocating motion. As shown in FIG. 3, the ball 1096 produces a traveling compressive wave along the fascia in front of its path as it is pushed along the surface by the user. The rotation of the ball allows the wave to be created without uncomfortable frictional drag along the fascia surface. The compressive wave region of the fascia is compressed, while the region of fascia that trails the ball is stretched. As the user reciprocates the ball along the massage-receiving surface, the fascial regions surrounding the ball experience alternating modes of compression and stretching as the traversing direction is changed.

Another myofascial massage device is taught by prior art US Patent application US2008/0058687 A1, which is a non-motorized massage device which utilizes multiple rollers. FIG. 4 is an illustration of that device as reproduced from that disclosure and explains two pairs of rollers that rotate upon skewed axles as a user traverses the device along a targeted fascia. The user's reciprocating motion alternately compresses and stretches the fascia region between the two pairs of rollers, producing myofascial massage along the elongate axis of the muscle fibers which are oriented with their elongate axis parallel to the axis of the limb. The disclosure's author claims that the device is advantageous in comparison to conventional massage gun devices, explaining;

> The conventional massager does not exercise the body muscle because muscle toning needs to pull and contract muscle (US2008/0058687 A1 @ [0002])

A second massage technique that is said to relax muscles and treat cellulite is called Tapotement, which is merely the rapid and repeated striking of the fascia. This technique is commonly known as "percussive massage" in laymen's terms. Tapotement massage techniques are techniques that are used by therapists upon body fascia that involve percussion movements, such as tapping, thumping, pounding, cupping and similar strikes. FIG. 5 illustrates the hand movement of a massage therapist when performing one exemplary type of percussive massage. In this illustration, the fingers are extended. In other percussive massage variations, the fingers are folded inward to form a fist.

Mechanical devices that simulate percussive massage are commonly called "massage guns" or "fascia guns". These devices use a reciprocating piston to impart percussive forces against a target area of the fascia and are said to be effective for treatment of the deeper fascia and muscle tissue. Many such devices have been patented and commercialized, and some have been marketed as "Anti-Cellulite Massagers". An example of a battery powered percussive massage gun configuration is shown in the illustration of FIG. 6 which is similar to the configurations described in a myriad of prior art design patents and utility patents.

Referring to FIG. 6, a massage gun 900 has a percussive massage head 905 with a spherically crowned shape which is mounted on the end of a piston 906 that reciprocates in the direction of the axis of the arrow 904 within the housing 902 to create a reciprocating plunging movement of the head 905. The main housing 901 has a cylindrical extension 903 which houses a battery-driven motor. As exemplified in many prior art devices, the cylindrical battery assembly 918 has the dual functions of housing the battery and also acting as the handle for the massage gun 900. The user grips the cylindrical extension 918 in a way similar to grasping a pistol and then presses the massage head 905 against the target muscle or tissue of the human body. The reciprocating head motion is initiated by engaging an "ON" switch. This type of massage device produces only up and down reciprocating motion of the massage head 905 perpendicular to the fascia surface. Additionally, the person holding these devices experiences a "reactionary bounce" which causes difficulty in holding the device steady over a chosen muscle target.

The effectiveness of the massage gun depends upon the user's ability to hold the gun steady while applying pressure to the target fascia location. The percussive action of the reciprocating head causes an equal and opposite reaction at the user's hand, causing the body of the massage gun to jump around. The instability makes it difficult to hold the gun focused at the target location, especially at low piston reciprocating speeds. The reaction on the user also causes fatigue when attempting to focus the gun on a specific location for a sustained period of time.

One solution for improving stability of the massage head over the muscle target is to use two hands to steady the massage gun as described in U.S. Pat. No. 10,959,908 B2 to inventor Steven Lee et al. (referred to as Lee '908). Lee '908 discloses an ergonomically improved massage gun that uses two handles that are arranged in the shape of a Y as shown in prior art FIG. 7. Prior art FIG. 8 is an excerpt from Lee '908 which shows the Y shaped massage gun being used on a person's thigh. Lee '908 explains that;

> The two handles allows the therapist to apply the massage with significant force, and the relatively large distance between the locations where the therapist is gripping the device allow for significant stability so that the massager 10 does not easily slip away from its intended position and the targeted spot on the patient's body. (Lee '098 7:65-66, 8:1-4)

> The user can comfortably hold the percussive massage appliance 10 with both hands while delivering to himself a percussive massage via reciprocating action of the percussive massage head. (Lee '098 7:43-46)

The massage gun disclosed in U.S. Pat. No. 11,752,064 B2 includes a wheel attached to the percussive head which allows the device to be traversed along the fascia surface without creating sliding friction against the fascia. FIG. 9 is an excerpt from that disclosure which teaches a massage gun 5 having a wheel 36 mounted upon a piston 20 which moves along a straight line axis L1. The disclosure explains;

> As such, the wheel 36 is free to rotate AW about the wheel axis along a person's skin as the wheel 36 additionally produces the percussive therapeutic effect along a longitudinal axis L1 of the attachment post 25 driven by the piston 20. ('064 3:20-24)

However, the single wheel does nothing to steady the massage gun or mitigate the bounce problem. Moreover, the device cannot provide cyclic motor-driven forces along a direction parallel to the fascia surface.

FIG. 10 illustrates a massage gun having a focusing rest as taught by copending patent application US 2022/0160578 A1. A focusing rest is used to anchor the massage gun in a steadied position upon the fascia surface while focusing treatment upon a specific muscle. Rollers are adapted to this device to make the massage device easily traversable with a reciprocating motion along the fascia surface in a self-standing attitude. The prior art device shown in FIG. 10 facilitates lateral movement of the percussive head while stabilizing the massage device to facilitate rolling, traversing motions. The device may be traversed along the massage-receiving surface in the direction shown by arrow 1244. The device possesses two stabilizing rollers 1220 and 1230 which freely rotate upon axle 1211. A third roller 1224 is mounted on a motor-driven piston that pulsates bidirectionally with an up and down reciprocating motion along a single vector indicated by arrow 1248. The roller 1224 also rotates freely upon axle 1240 as the user traverses the assembly 1200 along the massage-receiving surface. The axles 1240 and 1211 are fixed to the device in a direction that is orthogonal to the direction 1244.

The stabilizing rollers 1220 and 1230 act to relieve the "reactionary bounce" problem encountered by the user in holding a conventional massage gun steady. However, none of the rollers 1220, 1230, or 1224 induce opposing forces in a direction parallel to the massage-receiving surface to stretch and compress the fascia. While relieving the stability problem, the device in FIG. 10 can nevertheless only produce percussive forces perpendicular to the fascia surface. None of the prior art devices referenced above allow the simultaneous motor-driven application of Myofascial Release and Tapotement when the device is held steady at a position which is targeting treatment upon one specific fascia region.

SUMMARY OF THE PRESENT INVENTION

The unique massage device being disclosed herein is designed to provide massage by collectively automating the two types of massage techniques which are normally utilized by massage therapists, including Myofascial Release and Tapotement (percussive massage). These two massage techniques have been described in the prior art to treat cellulite (decompose fat cells), increase blood flow, decrease muscle stiffness, repair muscle tissue, reduce joint inflammation, for pain relief, and for increasing the flexibility of the fascial layers.

The Multi-axis Massage Gun being described herein comprises a handheld, portable massage device with a self-standing roller-supported configuration. The massage head comprises a massage roller which orbits circularly about a virtual axis while inducing massage forces in directions along the surface of the fascia and also in directions perpendicular to the fascia surface, such that the device simultaneously combines the advantages of Myofascial Release and Tapotement (percussive massage).

The device is simple, compact and relatively easy to manufacture in comparison to the prior art percussive massage guns that require complex mechanical linkages. The handheld device is completely portable and light weight, being powered by a small DC motor which receives its power from onboard rechargeable batteries and cooperates with onboard activation control. Treatments with this device do not require skin lubricants and can be made by the user in their own home or in the gym using one hand without reliance upon a massage therapist. The configuration and operation of the device will be better understood from the illustrated figures and descriptions that follow.

DETAILED DESCRIPTION OF THE PREFERRED EMBODIMENTS

Figure 11:
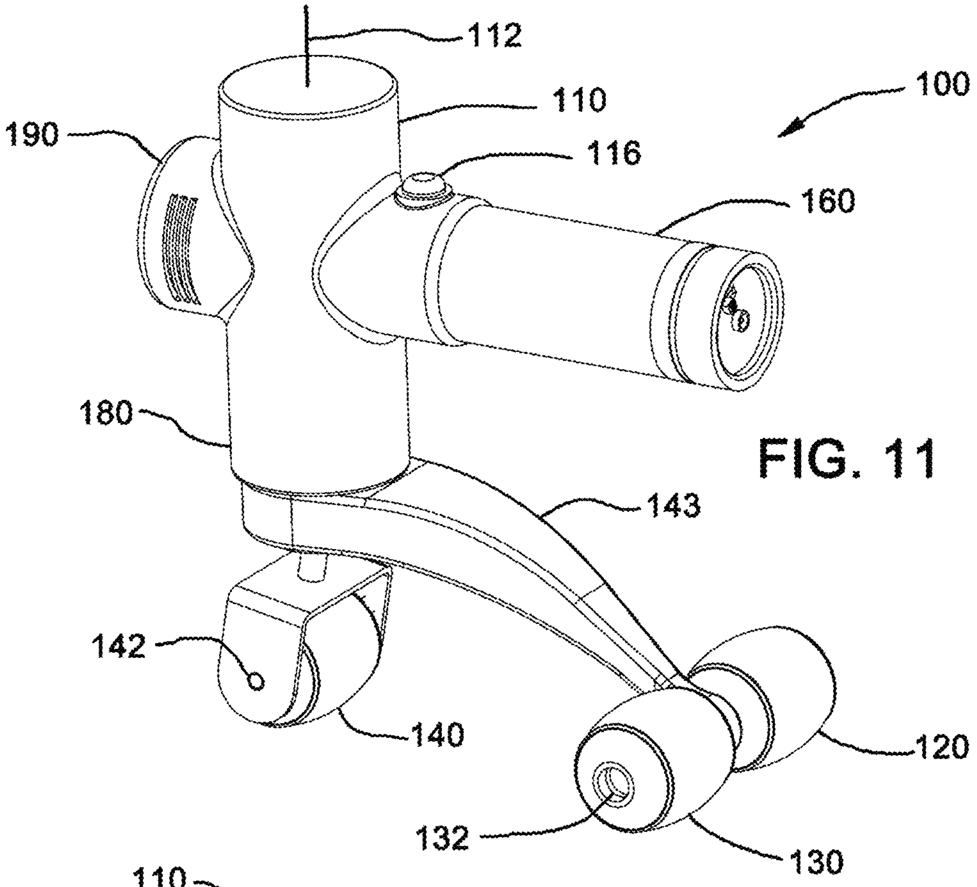
FIG. 11 is an isometric view of the massage device being described as the preferred embodiment of the current invention.

FIG. 11 illustrates an isometric view of the massage device being described as the preferred embodiment of the invention herein. The device 100 comprises a main body 110 having a series of appendages serving the functions of supporting the device and housing the functional components. The device is supported in a self-standing orientation while resting upon a roller suspension comprising three freely rotatable rollers 120, 130 and 140 which are arranged in a tripod-like configuration. The spacing amongst the first roller, the second roller and the third roller is proportioned to provide a self-standing tripod suspension which maintains the axis 112 of the main body substantially perpendicular to a fascia surface of a target muscle absent a grasp of the user.

A first roller 120 and a second roller 130 are freely rotatable upon a first axle 132 which is located at the distal end of the focusing rest 143 that is adjoined to the main body 110 at its proximal end. The focusing rest 143 has an axis that is non-coincident with the axis of the motor-driven piston and an axis that is parallel to the handle portion. A third roller 140 is attached to a piston which orbitally reciprocates within the piston housing 180 while inducing the roller 140 to orbit upon a circular path. Roller 140 freely rotates upon axle 142 which is attached to the distal end of the piston, the roller 140 defining a percussive massage roller which creates percussive contact upon the fascia surface without imposing any frictional drag. The non-vibratory rollers 120 and 130 are not powered and maintain non-vibratory contact with the fascia surface. The non-vibratory rollers rest upon the fascia surface in first operating mode, or roll along the fascia surface in a second operating mode.

The device 100 may be operated in two modes including a first stationary mode and a second traversing mode. The device may be held in a stationary position upon a fascia surface while supported by roller suspension when targeting one specific fascia region. In this mode, the massage roller 140 induces motion upon the fascia in directions both vertical and parallel to the fascia surface while the first and second rollers remain stationary upon the fascia surface.

The second operating mode allows the user to reciprocate the roller-supported, self-standing device while applying sweeping massage action along the fascia surface. The user may rest the rollers upon a fascia surface in the self-standing position, grasp the handle with a single hand, activate the motor-driven orbitally reciprocating piston, and roll the device along the fascia surface in reciprocating strokes while maintaining slight downward pressure with the single hand.

The two operating modes are made possible by the focusing rest 143 where the term "focusing rest" was explained in copending patent application Ser. No. 17/488,831 filed Sep. 29, 2021 (Publication No. US 2022/0354735A). The term describes an appendage that allows the massage gun to be stabilized by resting a non-vibratory surface upon the fascia while focusing the reciprocating portion upon a particular muscle or fascia region. The adoption of non-vibratory rollers 120 and 130 on the distal end of the focusing rest 143 allows the roller supported massage gun to be easily traversed along the fascia surface in sweeping frictionless reciprocating strokes by the user (second operating mode). The non-vibratory rollers maintain rolling contact with the fascia surface while the massage roller 140 maintains percussive contact with the fascia.

The main body 110 has an axis 112 oriented substantially perpendicular to the surface upon which the three rollers 120, 130 and 140 rest. A cylindrical projection 190 projects perpendicular to axis 112 and has the function of housing the motor which reciprocates the piston. Another cylindrical projection 190 extends oppositely of the motor housing 190 and has the function of providing a single handle 160 which is designed to allow the user to grasp the device 100 with one hand. In some embodiments the handle 160 contains a cavity which houses removeable and/or rechargeable batteries for powering the device motor. In other embodiments, the handle 160 is removeable and contains a battery pack capable of remote charging. The device motor is powered on and off by the pushbutton 112 which is accessible to the user's thumb while grasping the handle 160.

A focusing rest 143 projects from the main body and supports non-vibratory rollers 120 and 130 which are freely rotating about axle 132 which is fixedly attached to the focusing rest 143. The proximal end of the focusing rest 143 is fixedly attached to the piston housing portion 180 of the main body 110.

Figure 12:
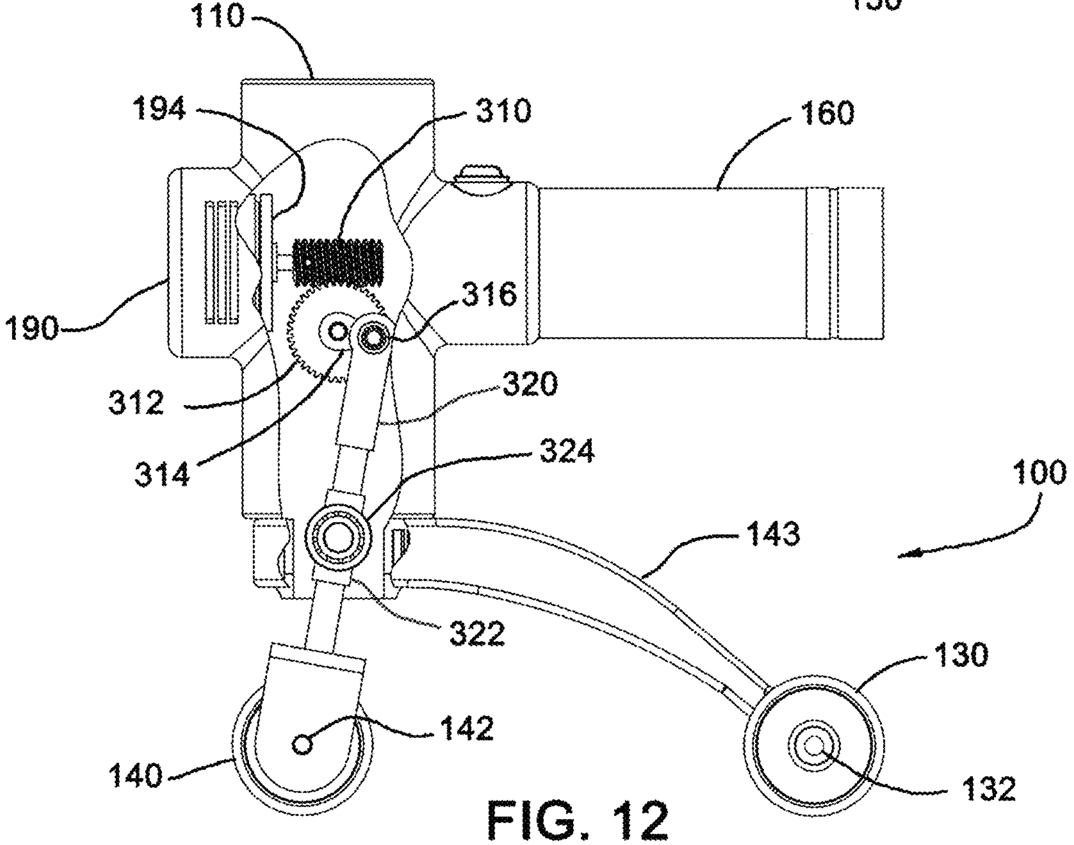
FIG. 12 is a cut away view of the massage device of FIG. 11 showing the internal piston drive mechanism.

The piston drive mechanism is especially simple when compared to many prior art massage guns. FIG. 12 is a side elevation view of the device 100 with the main body 110 shown in cut away fashion to expose the piston drive mechanism which resides within the main body 110. The device utilizes a single gear set comprising a worm screw and a worm gear to both rotate and translate the upper end of the piston 320. A worm screw 310 is coupled to the shaft of the drive motor 194 and in mesh with the worm gear 312. An eccentric crank 314 is attached to the worm gear 312 and is rotationally driven by the worm drive.

The piston 320 possesses a ball bearing 316 which is rotationally attached to the eccentric at one distal end of the piston. The piston is attached to the second axle 142 of the third roller at its opposite distal end. The piston is supported and guided by the piston rocker 322 which possess a circular bore 325 which slidably constrains the circular portion of the piston 320. The piston rocker 322 thus forms a rotational joint which allows the piston to both translate and rotate. Two ball bearings 324 are fixedly attached to the main body 110 and rotationally support the piston rocker 322. As the eccentric 312 rotates, the piston 320 slides within the bore of the piston rocker 322 and also rotates about the center of bearings 324. The resulting piston movement is described as orbitally reciprocating. The orbitally reciprocating piston motion distinguishes device 100 from conventional massage guns whose pistons move only with straight line oscillation.

Figure 13B:
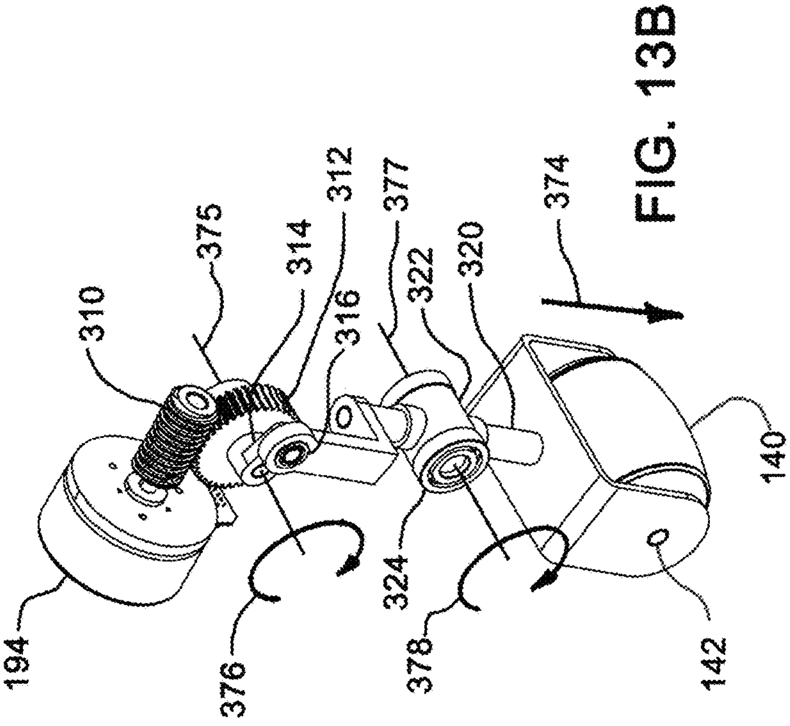
FIGS. 13A, 13B and 13C are explanatory views of the piston drive mechanism when isolated from the massage device housing.
Figure 13A:
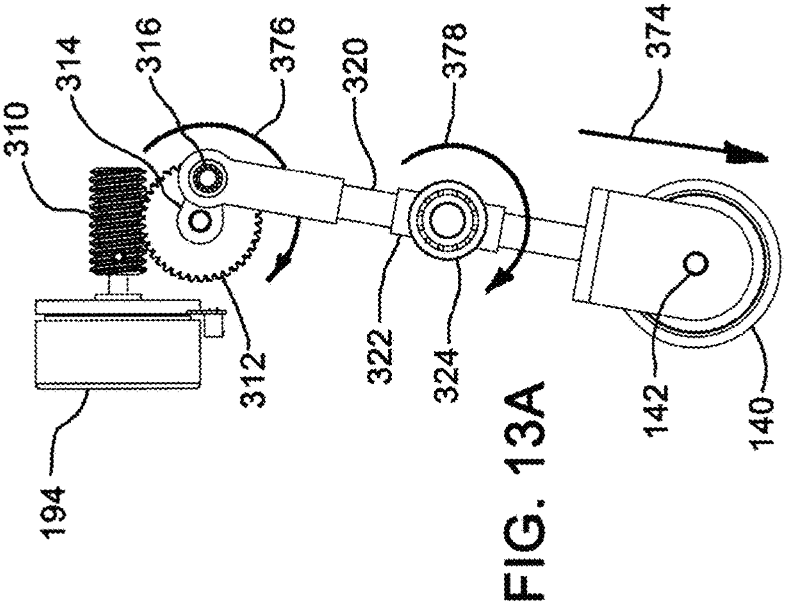
Figure 13C:
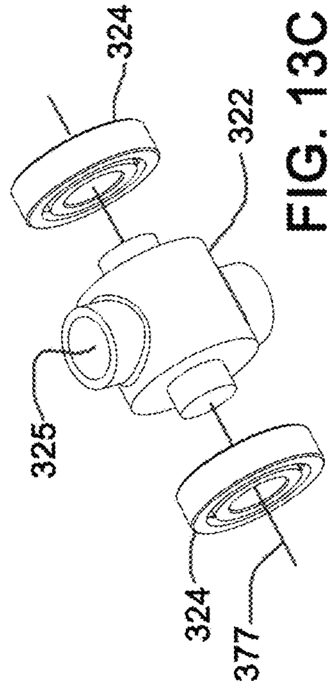

FIGS. 13A, 13B and 13C illustrate views of the orbitally reciprocating piston drive mechanism when isolated from the device 100. FIG. 13A is a side elevation view and FIG. 13B is an analogous isometric view of the simple mechanism which utilizes only one gear set to implement multi-axis massage forces. A single gear set comprising a worm screw 310 and a worm gear 312 is driven by a DC motor and rotates continuously when the device 100 is actuated. A connecting crank 314 is fixedly attached to the worm gear 312 and provides a journal for attaching the piston 320 to the rotating worm gear 312. Ball bearing 316 is attached to the piston 320 at its upper distal end and the massage roller 140 is rotatably attached to the piston at its lower distal end. The single motor-driven gear set (310 and 312) is responsible for the multi-axis motion of the percussive massage roller 140.

Referring to FIG. 13C, the piston 320 derives its guidance from a piston rocker 322 which rotates within ball bearings 324, where the ball bearings 324 are fixedly attached within the housing 180. The circular portion of piston 320 is captured within the bore 325 of the piston rocker 322 which constrains the piston to reciprocate within the bore, whose axis rotates about the axis of ball bearings 324. The arrows in FIG. 13A and FIG. 13B explain that the piston 320 both rotates and translates as the worm gear 312 continuously rotates. As will be explained more fully below, the combined rotation and translation of the piston 320 induces the massage roller 140 to orbit along a circular path.

Figure 1:
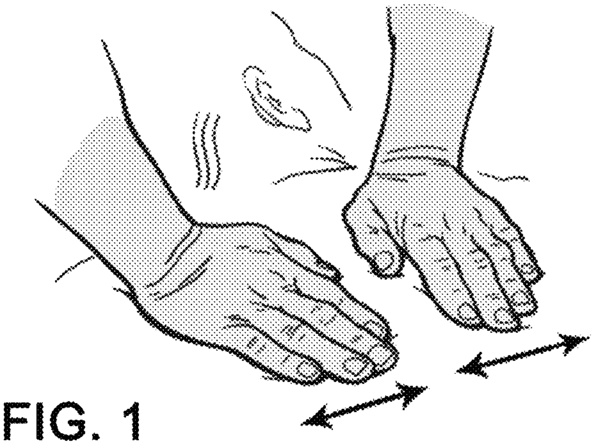
FIG. 1 PRIOR ART
FIG. 1 is an illustration of the hand movement utilized by a massage therapist while implementing the Myofascial Release technique.
Figure 2:
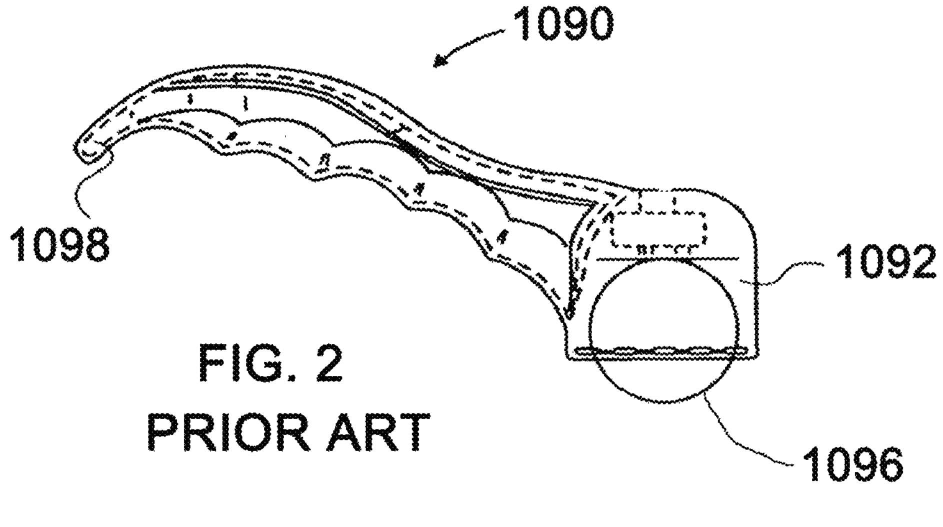
FIG. 2 PRIOR ART
FIG. 2 is an illustration of a prior art device which is utilized to implement the Myofascial Release technique.
Figure 3:
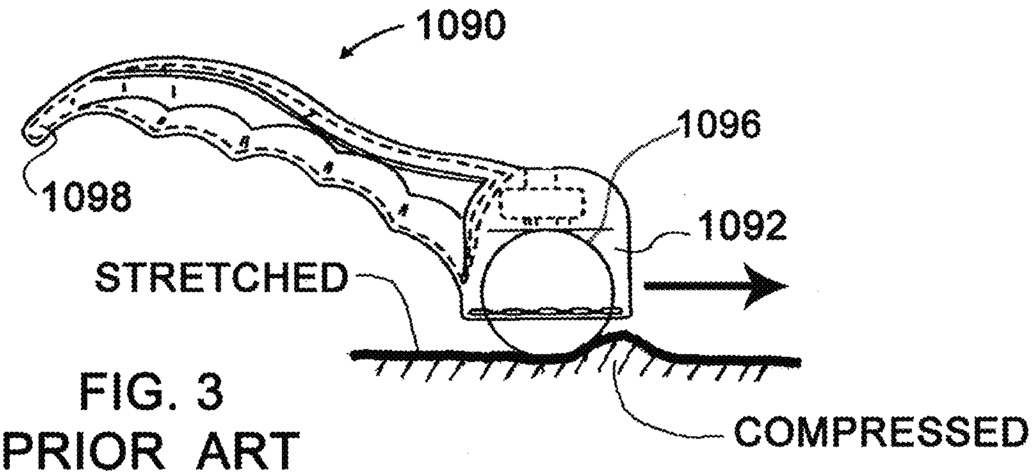
FIG. 3 PRIOR ART
FIG. 3 is an illustration of the operation of the massage device described in FIG. 2
Figure 4:
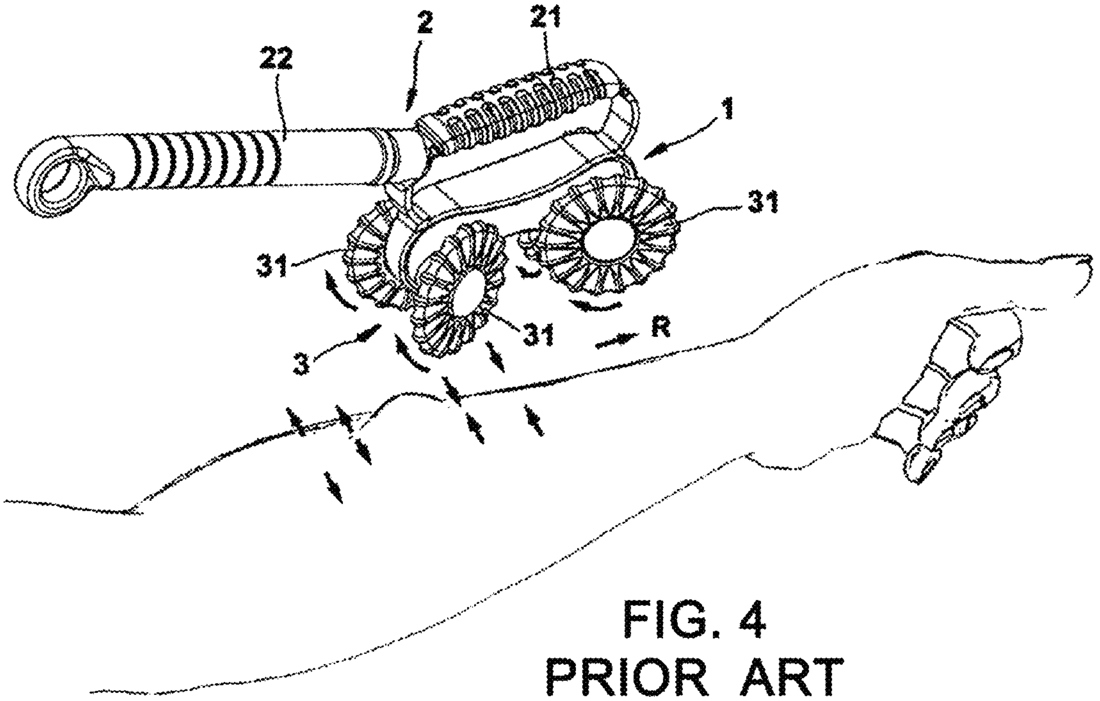
FIG. 4 PRIOR ART
FIG. 4 is an isometric view of another prior art massage device which is utilized to implement the Myofascial Release technique.
Figure 5:
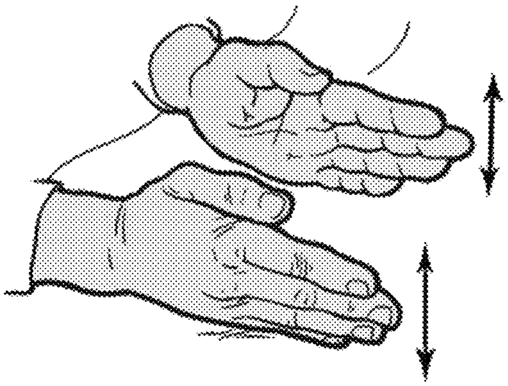
FIG. 5 PRIOR ART
FIG. 5 is an illustration of a hand movement utilized by a massage therapist while implementing the Tapotement (percussive massage) technique.
Figure 6:
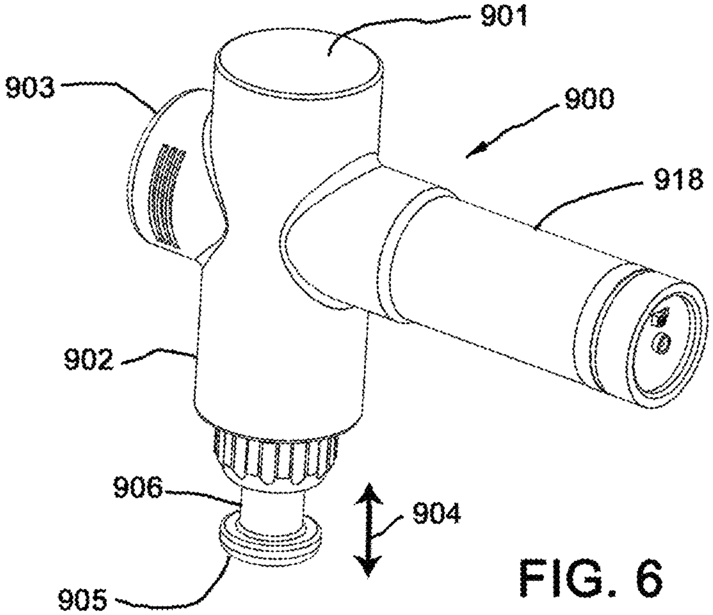
FIG. 6 PRIOR ART
FIG. 6 is an illustration of a prior art percussive massage gun which is utilized to implement percussive massage.
Figure 7:
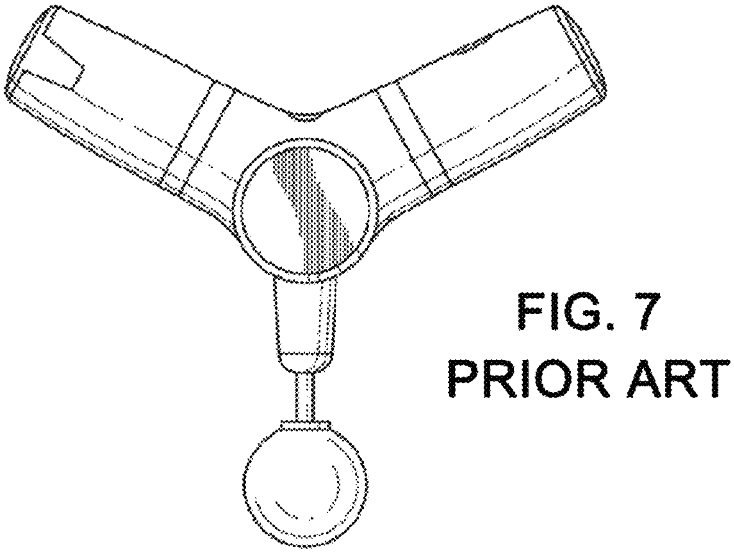
FIG. 7 PRIOR ART
FIG. 7 is an isometric view of another prior art massage device that utilizes two handles to steady the massage gun while applying percussive massage.
Figure 8:
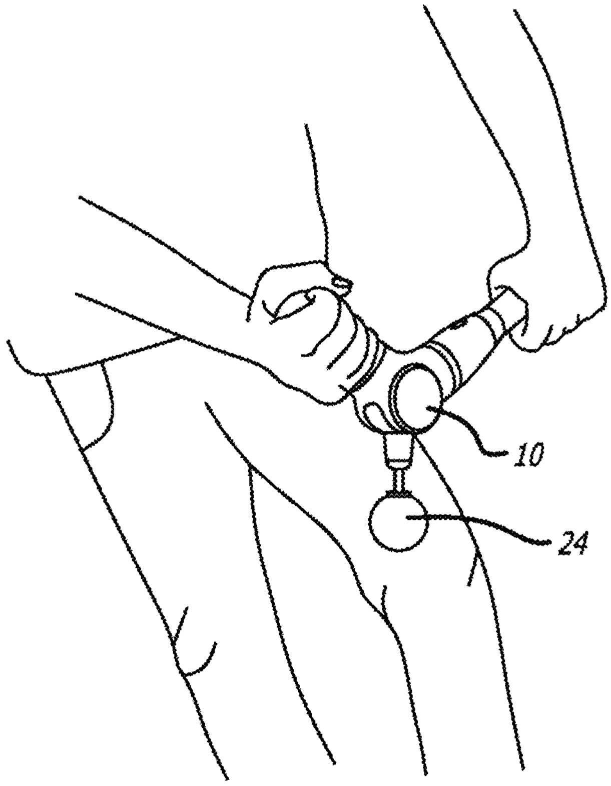
FIG. 8 PRIOR ART
FIG. 8 is an illustration of an exemplary application of the prior art massage device of FIG. 7.
Figure 9:
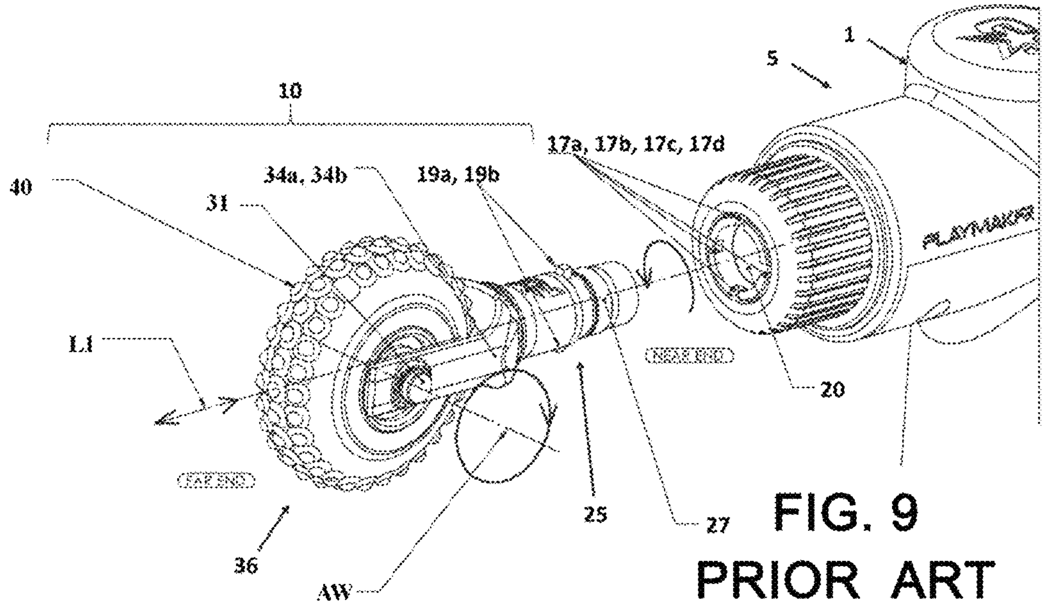
FIG. 9 PRIOR ART
FIG. 9 is an isometric view of another prior art massage device that is utilized for stabilizing a percussive massage gun while applying percussive massage.
Figure 10:
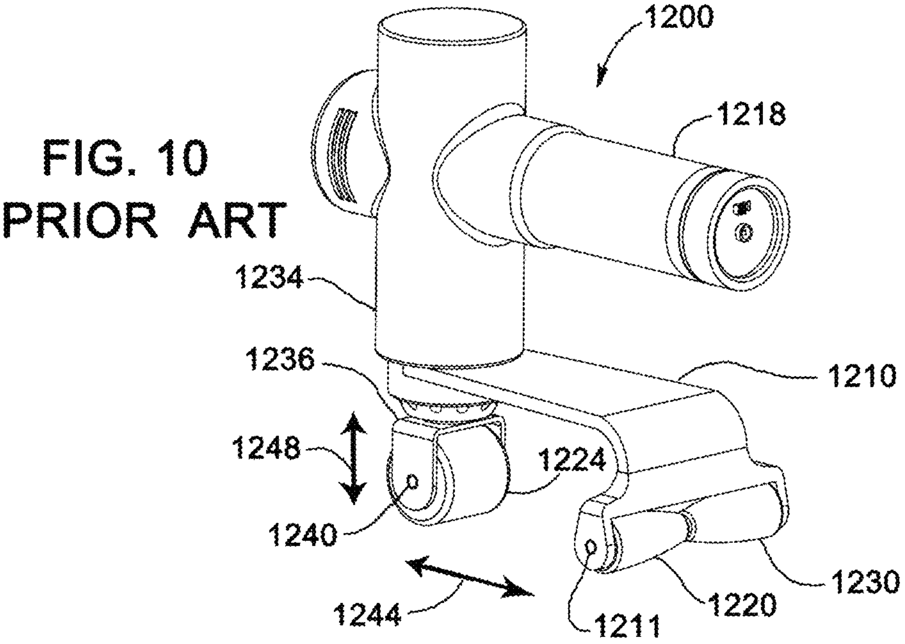
FIG. 10 PRIOR ART
FIG. 10 is an isometric view of another prior art massage device that is utilized for stabilizing a percussive massage gun while applying percussive massage in a traversing mode.
Figure 14B:
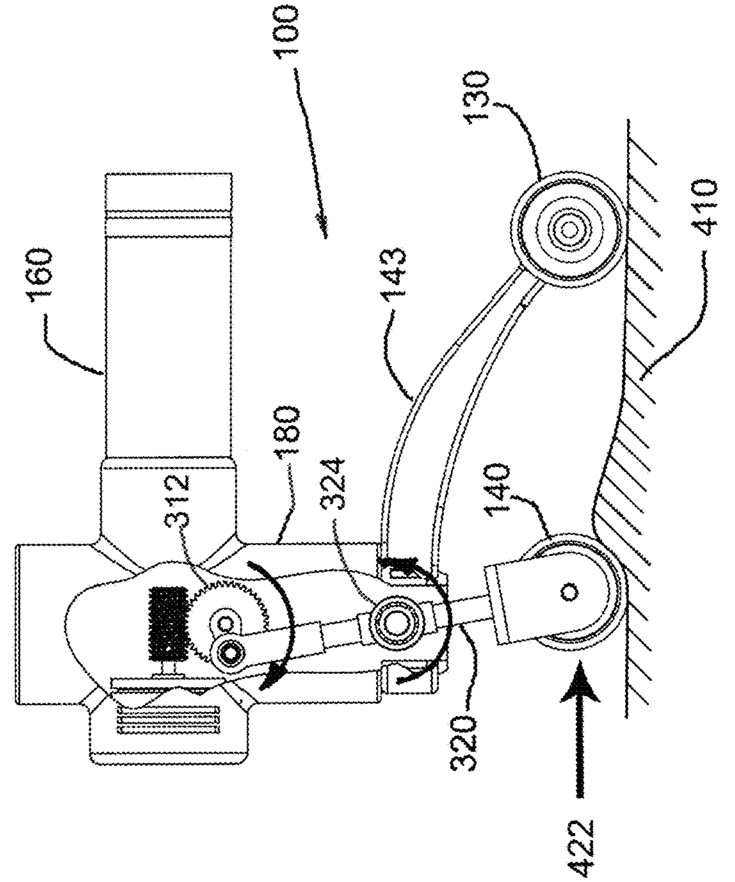
FIGS. 14A and 14B are views which show the compressive fascia wave that is formed in each direction along the fascia surface at two extreme positions of the massage roller.
Figure 14A:
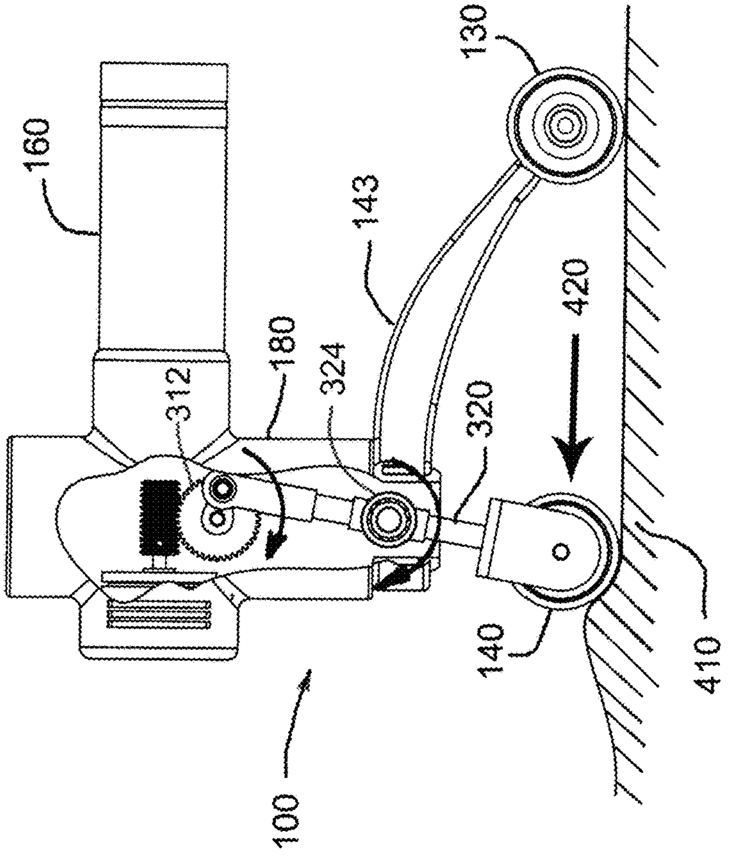

FIG. 14A and FIG. 14B illustrate the range of movement of the massage roller 140 as it moves relative to the generalized plane of the fascia surface 410. This Myofascial Release motion is illustrated by the directional arrows which indicate the relative motion of the massage roller 140 as it creates the travelling compressive waves in both directions along the fascia surface in the same manner as shown in FIG. 3. Referring to FIG. 14A, the gear 312 is rotating CW, inducing piston 320 to rotate CW about ball bearing 324 while moving the massage roller 140 in the direction of arrow 420. Referring to FIG. 14B, the gear 312 is rotating CW, inducing piston 320 to rotate CCW about ball bearing 324 while moving the massage roller 140 in the direction of arrow 422. This range of motion of roller 140 exists regardless of whether the device 100 is held stationary upon the fascia surface (first operating mode) or whether the device 100 is being traversed along the fascia surface with reciprocating strokes by the user (second operating mode). In either operating mode, the free rotation of the roller 140 allows the compressive wave to be created without uncomfortable frictional drag along the fascia surface.

Figure 15B:
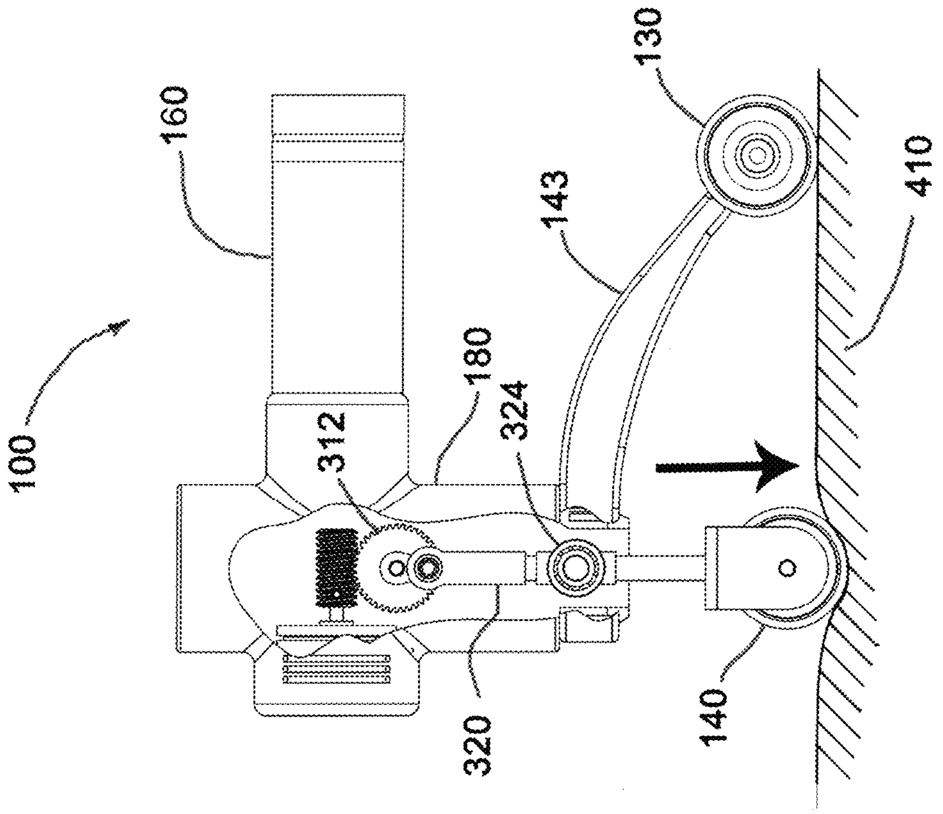
FIGS. 15A and 15B are views which show the extreme positions of the massage roller in the percussive direction which is perpendicular to the fascia surface.
Figure 15A:
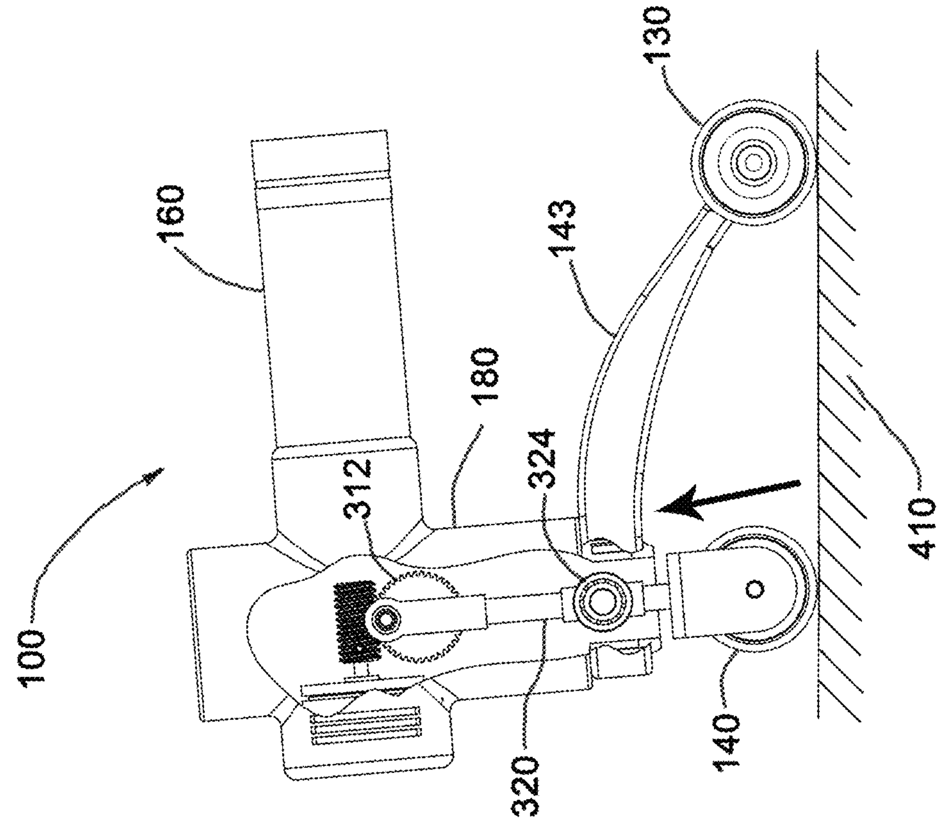

FIG. 15A and FIG. 15B demonstrate the range of motion of the massage roller 140 as it moves in the direction substantially perpendicular to the fascia surface. This motion illustrates the Tapotement (percussive) action of the device 100 which is superimposed upon the Myofascial Release motion during each rotational cycle of the eccentric 314. As is the case with the Myofascial Release motion illustrated in FIGS. 14A and 14B, the percussive motion shown in FIGS. 15A and 15B continues while the device is stationary (first operating mode) or whether the device 100 is being traversed along the fascia surface by the user (second operating mode).

Figure 16B:
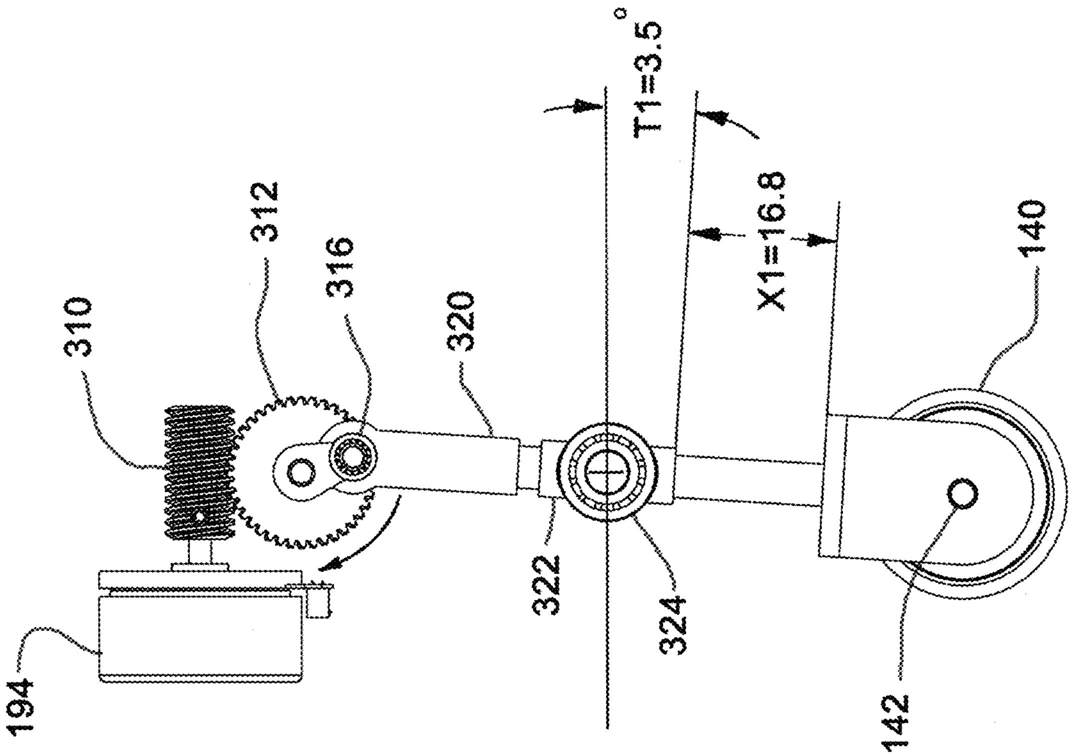
FIGS. 16A and 16B illustrate the piston drive mechanism in two successive positions while diagrammatically explaining the orbitally reciprocating piston motion.
Figure 16A:
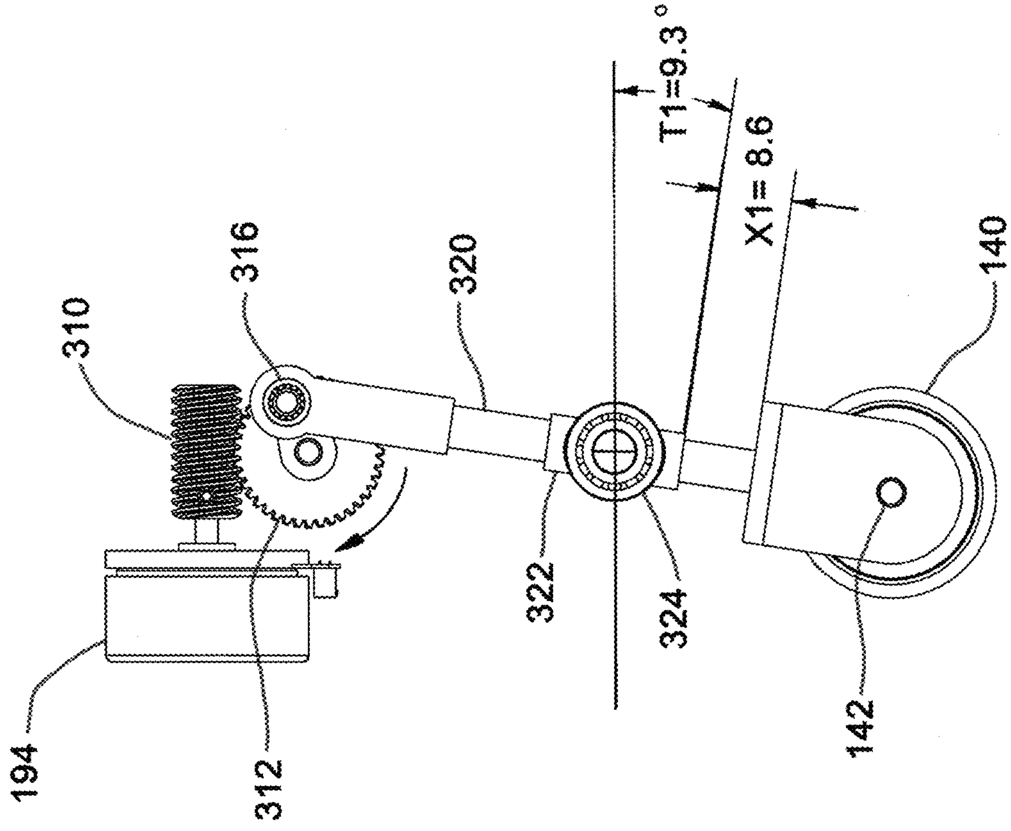

FIG. 16A and FIG. 16B illustrate the combined rotating and reciprocating motion of the piston movement which explains the term "orbitally reciprocating". The worm gear 312 is rotating CW in FIG. 16A where the piston bearing 316 is shown at about the two o'clock position on gear 312. The worm gear 312 continues to move CW in FIG. 16B and has advanced to the 5 o'clock position. During this movement, the piston 320 translates (slides) within the bore 325 of piston rocker 322 (see FIG. 13C) which increases the distance X1 from 8.6 mm to 16.8 mm.

During this translation of the piston 320 from 8.6 mm to 16.8 mm, the piston rocker 322 rotates within the ball bearing 324 which if fixedly attached the main body of the device 100. That rotation changes the indicated angle T1 from 9.3 degrees to 3.5 degrees as the piston 320 is configured to both slide and rotate within the piston rocker 322.

During an entire rotation cycle (360 degrees) of worm gear 312, the dimension X1 achieves a maximum and a minimum dimension as the piston reciprocates within the bore 325 of the piston rocker 322. The angle T1 is also constantly changing while the worm gear 312 rotates. The piston 320 is simultaneously orbiting angularly about the rotation center of ball bearing 324 as indicated by the everchanging angle T1. As the piston 320 both slides and rotates within the piston rocker 322, the resulting motion of the piston 320 is summarily described as "orbitally reciprocating".

Figure 17:
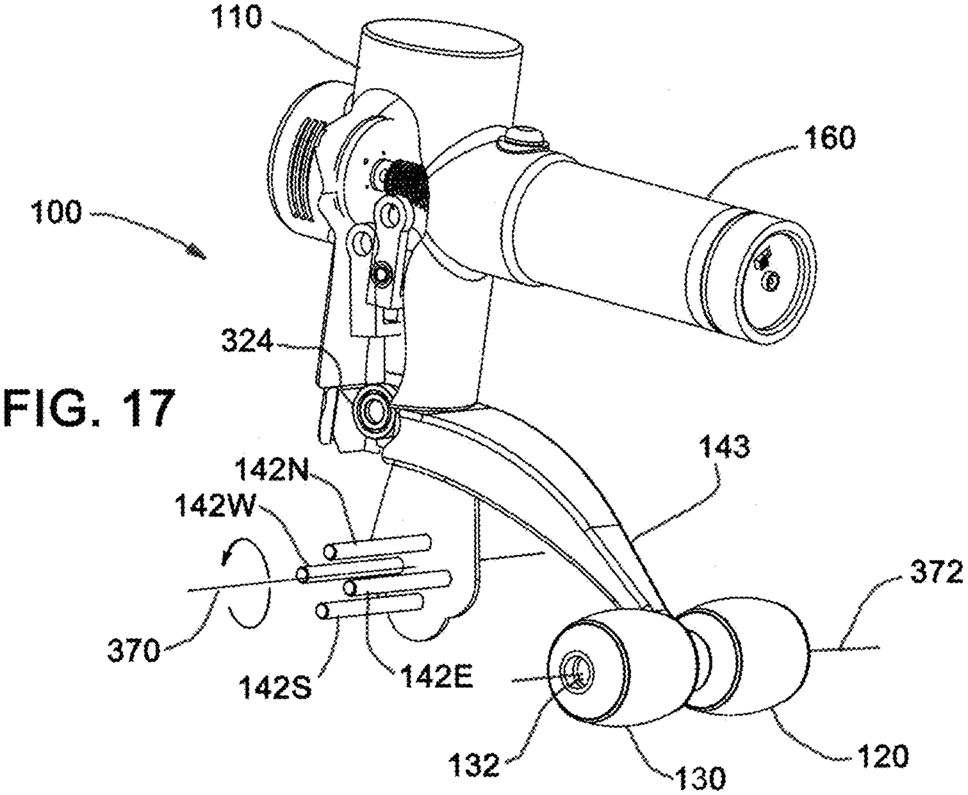
FIG. 17 is an isometric view that explains the orbit of the massage roller about a virtual axis.

A unique characteristic of the device 100 is the resulting orbital motion of the massage roller 140 (third roller) which orbits about a virtual axis, where the term "virtual axis" is construed to mean an axis in space having no physical axle or no physical bearing. FIG. 17 illustrates an isometric view of the device 100 showing the massage roller axle 142 (second axle) located at multiple extreme positions. The massage roller 140 is continuously driven along a circular path by the motor as the worm gear 312 rotates. However, the massage roller 140 is omitted in the view of FIG. 17 for the purpose of observing the circular path of the axle 142. It can be observed that the roller axle 142 orbits circularly about a virtual axis as the worm gear 312 completes each 360 degree cycle. The virtual axis is labeled as axis 370 where the axis 370 is parallel to the axis 372 of the first axle 132. The extreme positions of the second axle 142 are labeled 142N, 142S, 142E and 142W to symbolically signify north, south, east and west positions of the axle 142 as it orbits about virtual axis 370. The virtual axis 370 is parallel to the axis 372 of the first and second rollers, and virtual axis 370 also resides within a plane that is substantially parallel to the fascia surface.

Figure 18:
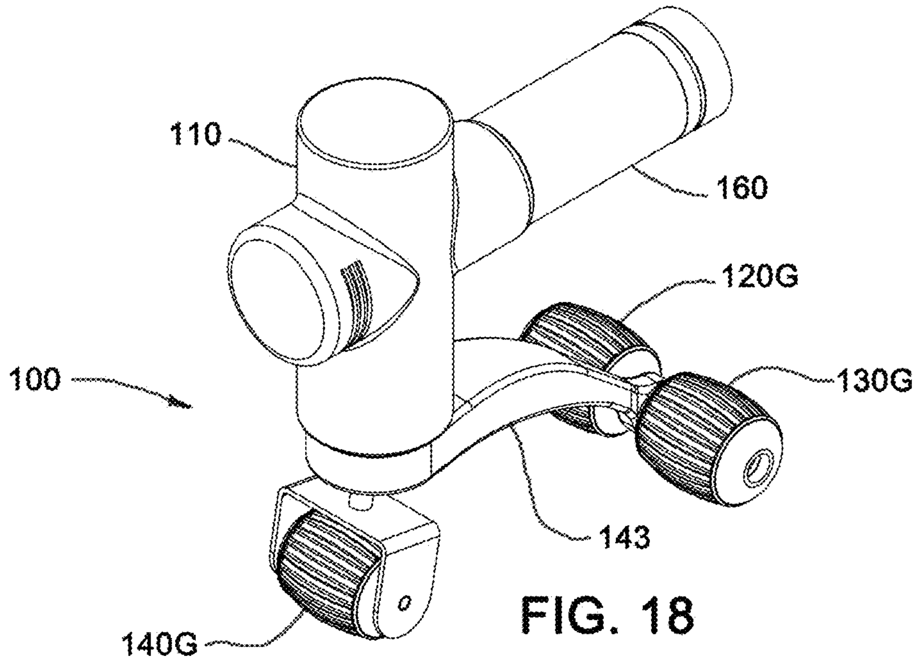
FIG. 18 is an isometric view of an alternate embodiment when adopting grooves to the roller surfaces for fascia stimulation.
Figure 19:
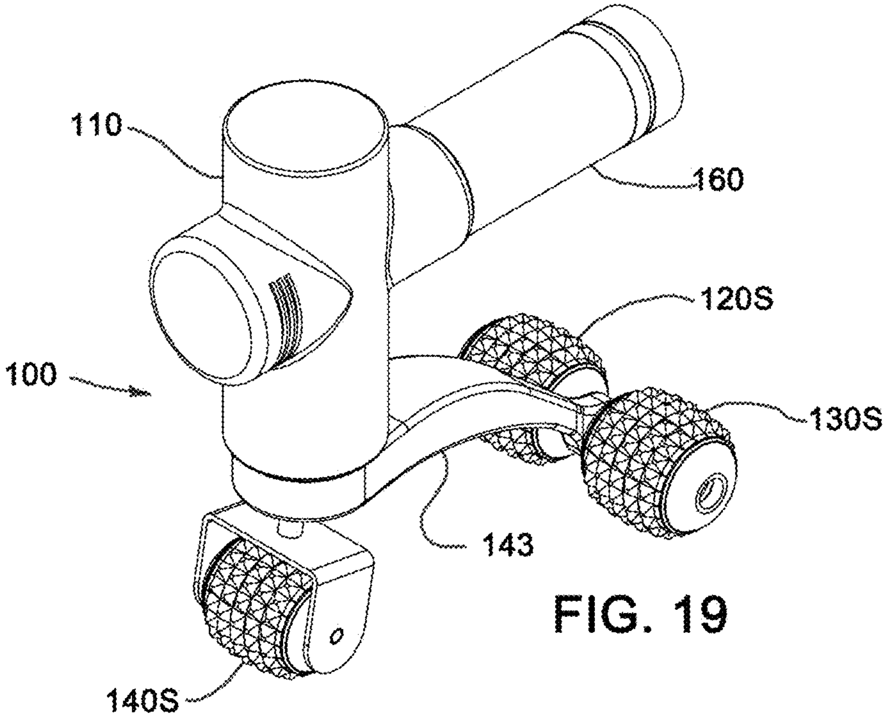
FIG. 19 is an isometric view of an alternate embodiment when adopting pyramidal projections to the roller surfaces for fascia stimulation.

The device may include rollers with various fascia-stimulating surface projections upon its roller surfaces in other embodiments. FIG. 18 illustrates the device utilizing rollers with shallow grooves patterned upon the spherical surfaces of its rollers. FIG. 19 illustrates the device utilizing small pyramidal projections patterned upon the spherical surfaces of its rollers.

Figure 20:
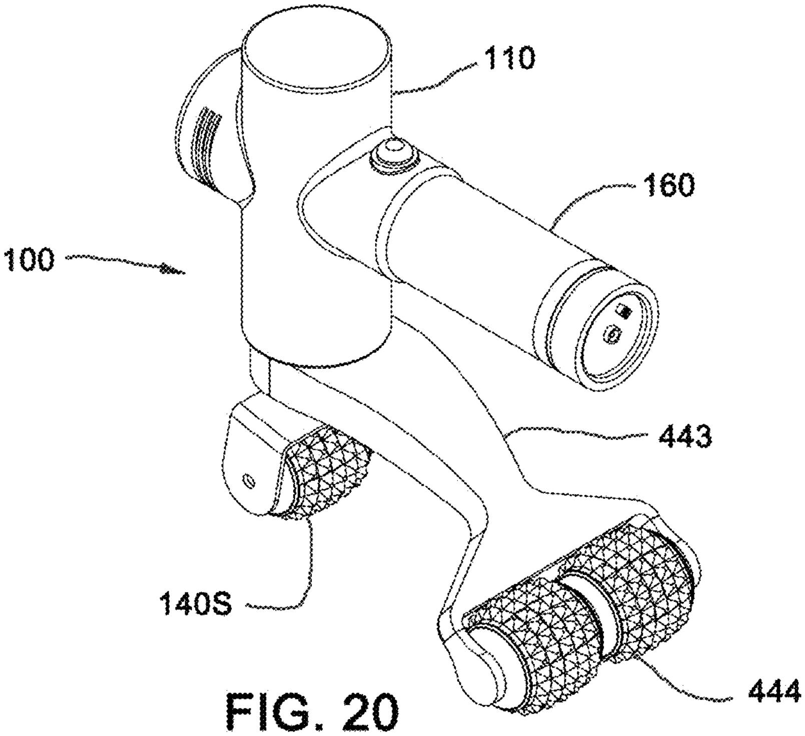
FIG. 20 is an isometric view of an alternate embodiment when the first and second roller are adjoined.

In other embodiments, the first roller and the second roller may be adjoined to each other and rotate upon the first axle. FIG. 20 illustrates an embodiment where the first roller 120S and the second roller 130S are adjoined together to form a unitary roller 144.

Figure 21:
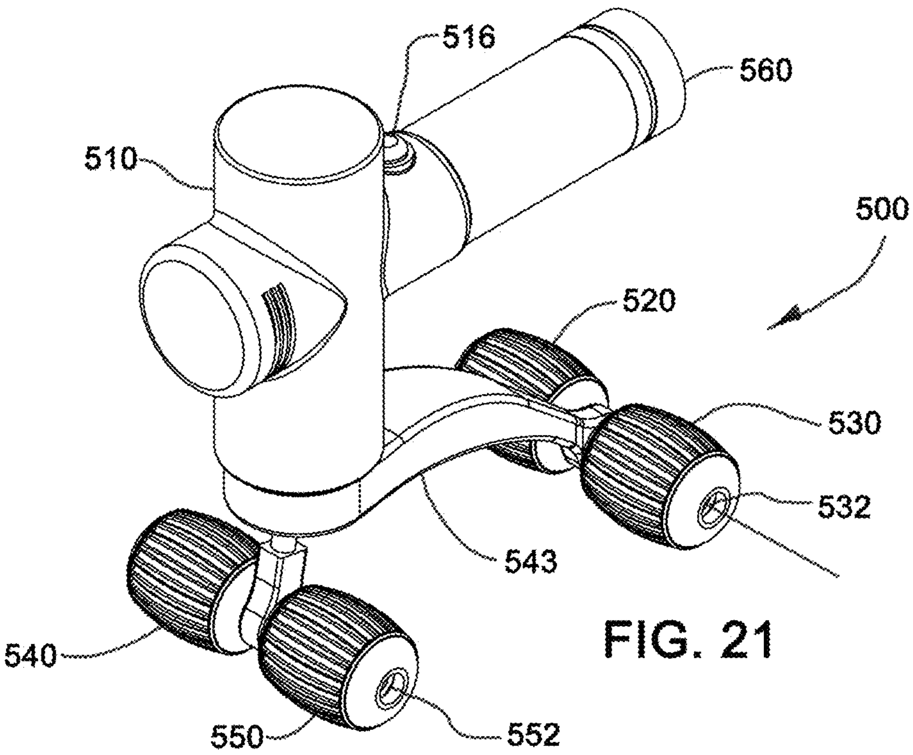
FIG. 21 is an isometric view of an alternate embodiment which utilizes two massage rollers mounted upon the second axle.

In other embodiments, the device 100 may be modified to increase the size of the fascia region being treated. That objective can be achieved by adding an additional roller to the distal end of the orbitally reciprocating piston 320. FIG. 21 illustrates an alternate embodiment illustrated by the device 500 which has been modified to mount two massage rollers 510 and 512 upon the axle 552 (second axle) of the orbitally reciprocating piston. The internal piston drive mechanism of device 500 is the same as that of device 100. A first roller 520 and a second roller 530 are mounted upon a first axle 532. A third roller 540 and a fourth roller 550 are mounted on a second axle 552. The two rollers 540 and 550 orbit synchronously with each other about the same virtual axis 370 as illustrated in FIG. 17.

Figure 22:
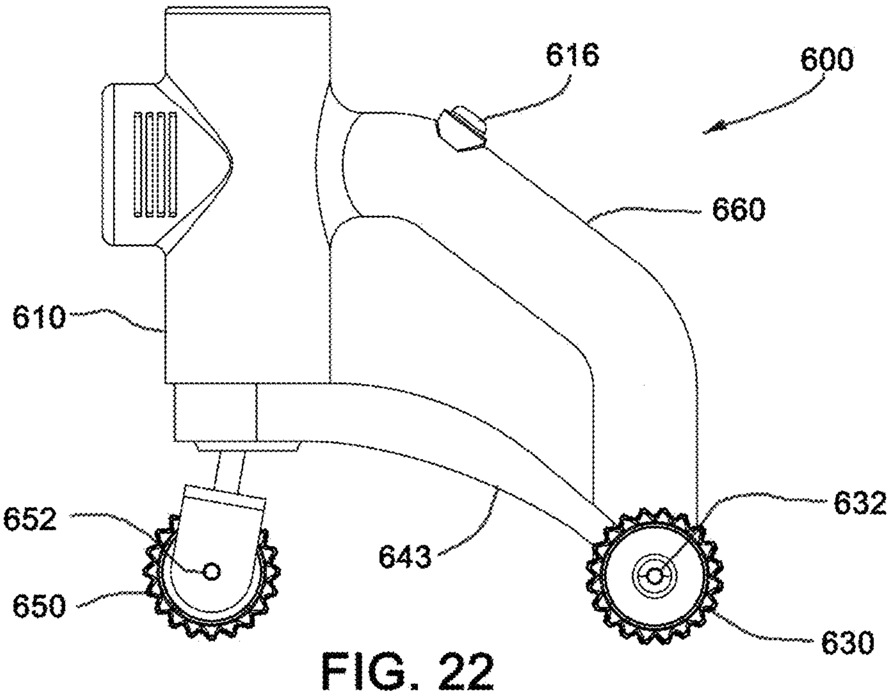
FIG. 22 is a side elevation view of an alternate embodiment where the handle is adjoined to the focusing rest.
Figure 23:
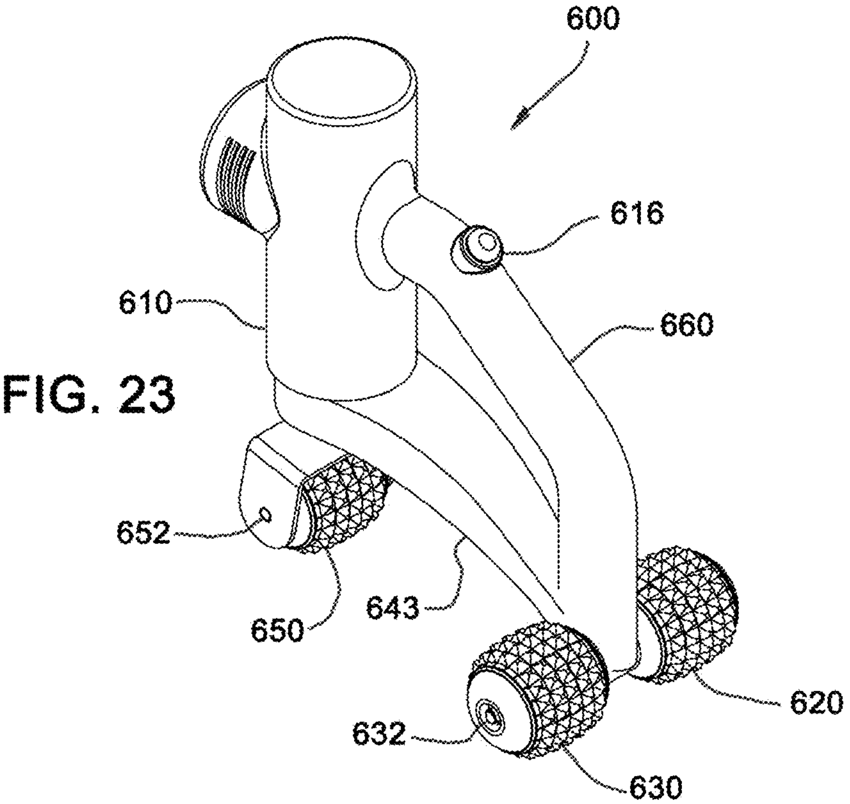
FIG. 23 is an isometric view of the device shown in FIG. 22.

The handle portion is adjoined to the distal end of the focusing rest in another alternate embodiment. This configuration as shown in FIG. 22 creates an overall structure that is more rigid and somewhat more compact while orienting the handle at an advantageous angle. Referring to FIG. 22, the handle portion 660 of device 600 is adjoined to the distal end of the focusing rest 643. The power button 616 is conveniently arranged such that it may be actuated by the user's thumb while grasping the handle 660 with one hand. FIG. 23 is an isometric view of the integrated handle configuration shown in FIG. 22 when adapted to the tripod suspension configuration that is taught by device 100. A first roller 620 and a second roller 630 freely rotate upon a first axle 632 while a third percussive massage roller 650 freely rotates upon the second axle 652.

What is claimed is:

1. A handheld self-powered percussive massage gun for utilization by a user upon a muscle comprising:

a main body defining a cavity and a single handle portion extending therefrom, the single handle portion configured to be graspable by the user for operating the percussive massage gun with one hand upon a fascia surface;

a piston orbitally reciprocating within a piston rocker while rotatably and eccentrically attached to a single motor-driven gear set at a first distal end received within the cavity of the main body;

the piston rocker configured to rotate about an axis which is parallel to the fascia surface;

wherein rotation of the piston rocker is configured to cause an axis of the piston to continuously change its angle with the fascia surface;

a focusing rest rigidly adjoined at a proximal end of the main body and possessing a first axle fixedly adjoined to the focusing rest at a distal end, the focusing rest having an axis noncoincident with the axis of the piston and parallel to and noncoincident with the single handle portion;

a first roller mounted upon the first axle, and freely rotatable thereon, configured for creating non-vibratory contact with the fascia surface;

a second roller mounted upon the first axle, and freely rotatable thereon, configured for creating non-vibratory contact with the fascia surface;

a second axle rigidly adjoined to the piston having an axis that is parallel to the first axle, the axis of the second axle being maintained perpendicular to the axis of the piston while moving in a circular path relative to the main body;

a third roller mounted upon the second axle, and freely rotatable thereon, configured for creating travelling compressive waves in opposing directions along the fascia surface in a first operating mode;

wherein spacing amongst the first roller, the second roller and the third roller is proportioned and configured to provide a self-standing tripod suspension which maintains an axis of the main body substantially perpendicular to the fascia surface of the muscle absent a grasp of the user;

the third roller is configured to be continuously moving along the circular path while the first roller and the second roller are held stationary upon the fascia surface in the first operating mode;

wherein the circular path comprises an orbit about a virtual axis, the virtual axis being oriented substantially parallel to the fascia surface;

wherein orbital reciprocation of the piston is configured to cause the third roller to reciprocate along the fascia surface with bidirectional excursions;

the third roller is configured to be continuously expanding and contracting its distance from the piston rocker;

wherein the circular path is configured to reside within a plane that is perpendicular to the fascia surface.

2. The percussive massage gun of claim 1, wherein each of the first roller, the second roller and the third roller are self-supporting and each configured to maintain rolling contact upon the fascia surface of the muscle as the third roller orbits about the virtual axis and the user traverses the percussive massage gun along the fascia surface of the muscle with the one hand in a second operating mode.

3. The percussive massage gun of claim 1, wherein the single handle portion and the focusing rest are adjoined.

4. The percussive massage gun of claim 1, wherein the piston is constrained to both slide and rotate within the piston rocker while orbitally reciprocating.

5. The percussive massage gun of claim 1, wherein surfaces of each of the first roller, the second roller, and the third roller possess stimulating projections.

6. The percussive massage gun of claim 1, wherein the first roller is adjoined to the second roller.

7. The percussive massage gun of claim 1, wherein the single handle portion is a removable battery housing.

8. A handheld self-powered percussive massage gun for utilization by a user on a muscle comprising:

a main body defining a cavity and a handle portion extending therefrom, the handle portion configured to be graspable by the user for operating the percussive massage gun with one hand;

a piston orbitally reciprocating within a piston rocker while rotatably and eccentrically attached to a single motor-driven gear set at a first distal end received within the cavity of the main body;

a focusing rest rigidly adjoined at a proximal end of the main body and possessing a first axle fixedly adjoined to the focusing rest at a distal end, the focusing rest having an axis noncoincident with an axis of the piston;

a first roller mounted upon the first axle, and freely rotatable thereon, configured for creating non-vibratory contact with a fascia surface;

a second roller mounted upon the first axle, and freely rotatable thereon, configured for creating non-vibratory contact with the fascia surface;

a second axle rigidly adjoined to the piston having an axis that is parallel to the first axle and perpendicular to the axis of the piston;

a third roller mounted upon the second axle, and freely rotatable thereon, configured for creating travelling compressive waves in opposing directions along the fascia surface in a first operating mode;

a fourth roller mounted coincidently upon the axis of the second axle, and freely rotatable thereon, configured for creating travelling compressive waves in opposing directions along the fascia surface in the first operating mode;

wherein spacing amongst the first roller, the second roller, the third roller and the fourth roller is proportioned and configured to provide a self-standing suspension which maintains an axis of the main body substantially perpendicular to the fascia surface of the muscle absent a grasp of the user;

the third roller and the fourth roller are configured to be synchronously and continuously orbited along a circular path by a motor while the first roller and the second roller are held stationary upon the fascia surface in the first operating mode;

wherein the circular path comprises an orbit about a virtual axis, the virtual axis configured to be oriented substantially parallel to the fascia surface; and wherein the circular path is configured to reside within a plane that is perpendicular to the fascia surface.

9. The percussive massage gun of claim 8, wherein each of the first roller, the second roller, the third roller and the fourth roller are self-supporting and each configured to maintain rolling contact upon the fascia surface of the muscle as the third roller and the fourth roller orbit about the virtual axis and the user traverses the percussive massage gun along the fascia surface of the muscle with the one hand in a second operating mode.

10. The percussive massage gun of claim 8, wherein the handle portion and the focusing rest are adjoined.

11. The percussive massage gun of claim 8, wherein the piston is constrained to both slide and rotate within the piston rocker while orbitally reciprocating.

12. The percussive massage gun of claim 8, wherein the surfaces of each of the first roller, the second roller, the third roller, and the fourth roller possess stimulating projections.

13. The percussive massage gun of claim 8, wherein the first roller is adjoined to the second roller.

14. The percussive massage gun of claim 8, wherein the handle portion is a removable battery housing.

15. A method of applying percussive massage to a fascia surface using a self-standing massage gun comprising a motor-driven piston, the method comprising the steps of a user:

resting non-vibratory rollers and at least one motor-driven orbiting roller of the massage gun upon the fascia surface in its self-standing position, wherein the self-standing position is maintained with the non-vibratory rollers and the at least one motor-driven orbiting roller contacting the fascia surface;

grasping a handle of the self-standing massage gun with a single hand while the massage gun is supported with the non-vibratory rollers and the at least one motor-driven orbiting roller;

activating the motor-driven piston to cause the at least one motor-driven orbiting roller to orbit within a plane perpendicular to the fascia surface about a virtual axis;

applying pressure toward the fascia surface; and rolling the massage gun along the fascia surface in reciprocating strokes while maintaining the self-standing position with the single hand.

* * * * *